(12) United States Patent
Fini et al.

(10) Patent No.: US 8,326,106 B2
(45) Date of Patent: Dec. 4, 2012

(54) BEND INSENSITIVITY IN SINGLE MODE OPTICAL FIBERS

(75) Inventors: John Michael Fini, Metuchen, NJ (US); Poul Kristensen, Valby (DK)

(73) Assignee: OFS Fitel, LLC, Norcross, GA (US)

( * ) Notice: Subject to any disclaimer, the term of this patent is extended or adjusted under 35 U.S.C. 154(b) by 154 days.

(21) Appl. No.: 13/005,353

(22) Filed: Jan. 12, 2011

(65) Prior Publication Data

US 2011/0194814 A1    Aug. 11, 2011

Related U.S. Application Data

(60) Division of application No. 12/072,869, filed on Feb. 28, 2008, now abandoned, which is a continuation-in-part of application No. 11/818,780, filed on Jun. 15, 2007, now abandoned.

(60) Provisional application No. 61/030,713, filed on Feb. 22, 2008.

(51) Int. Cl.
G02B 6/36    (2006.01)
G02B 6/02    (2006.01)

(52) U.S. Cl. ............ 385/127; 385/28; 385/126; 385/144

(58) Field of Classification Search .................... 385/28, 385/123, 126, 127, 144
See application file for complete search history.

(56) References Cited

U.S. PATENT DOCUMENTS

| | | | |
|---|---|---|---|
| 6,952,518 B2 * | 10/2005 | Zhang et al. | 385/126 |
| 7,817,892 B2 * | 10/2010 | Konstadinidis et al. | 385/128 |
| 8,107,784 B2 * | 1/2012 | Borel et al. | 385/127 |
| 2003/0021533 A1 * | 1/2003 | Ishikawa et al. | 385/37 |

* cited by examiner

*Primary Examiner* — Daniel Petkovsek

(57) ABSTRACT

An optical fiber that is relatively insensitive to bend loss comprises a core region and a cladding region configured to support and guide the propagation of light in a fundamental transverse mode, the cladding region including (i) an outer cladding region having a refractive index less than that of the core region, (ii) an annular cladding pedestal region having a refractive index higher than that of the outer cladding region and comparable to that of the core region, and (iii) an annular cladding inner trench region disposed between the core region and the pedestal region, the inner trench region having a refractive index less than that of the outer cladding region. In one embodiment, the fiber also includes a (iv) an annular cladding outer trench region disposed between the pedestal region and the outer cladding region, the outer trench region having a refractive index less than that of the outer cladding region. In addition, to suppress HOMs the pedestal region is configured to resonantly couple at least one other transverse mode of the core region to at least one transverse mode of the pedestal region. Such fiber is advantageously used as access fiber, but may have other applications, such as sensor fiber.

6 Claims, 8 Drawing Sheets

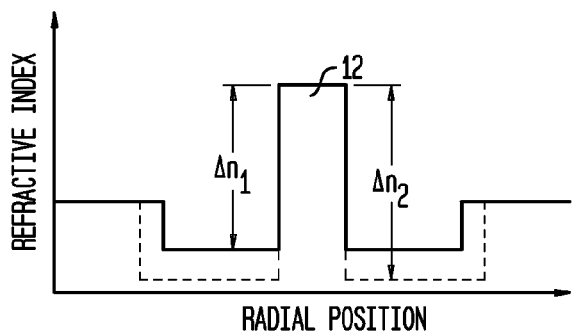
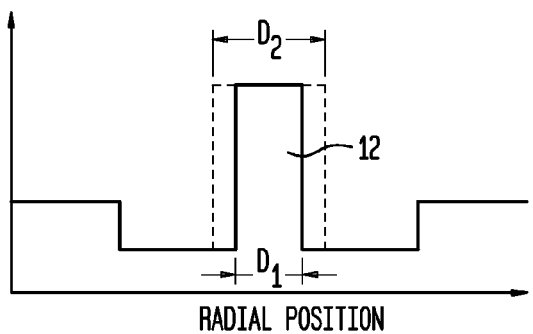
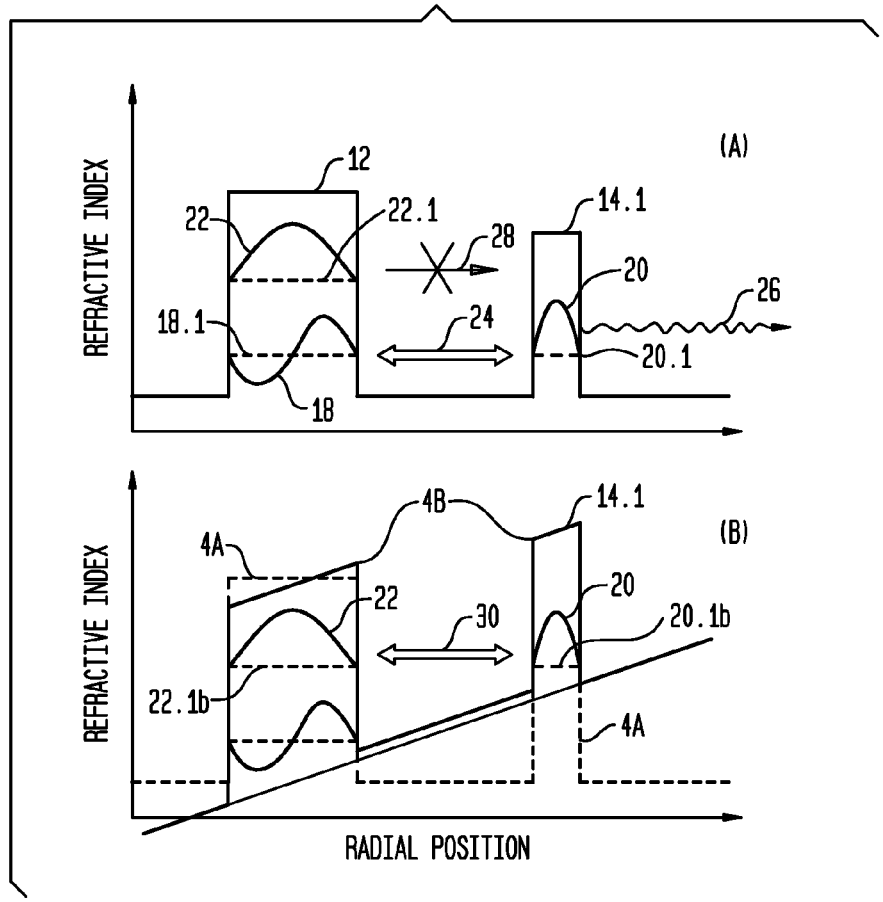

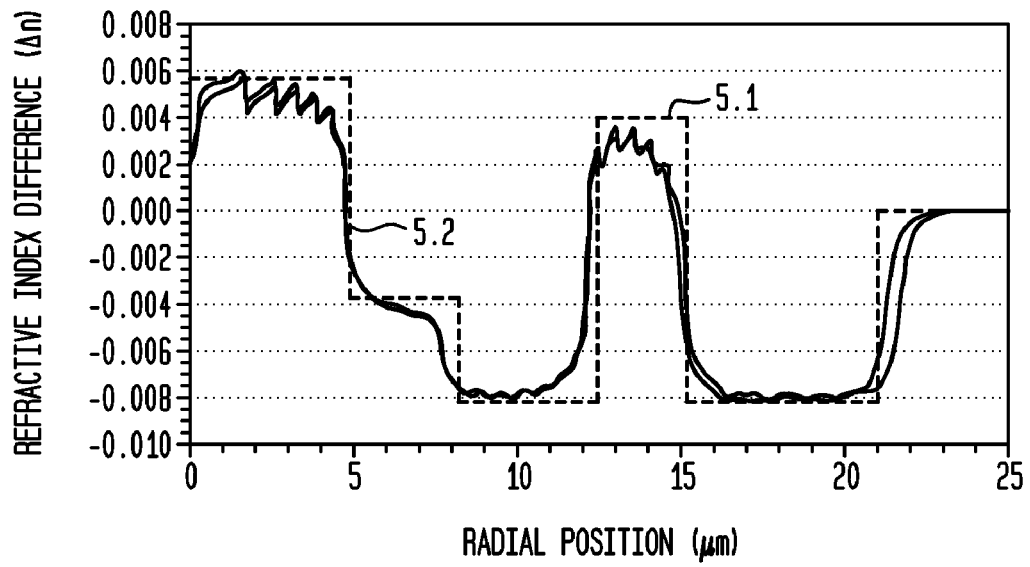
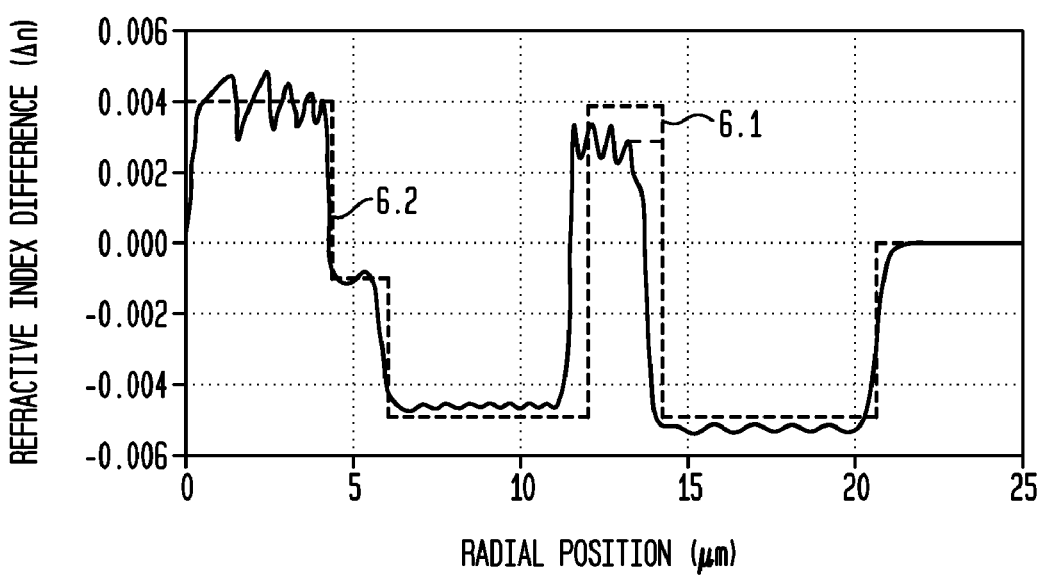

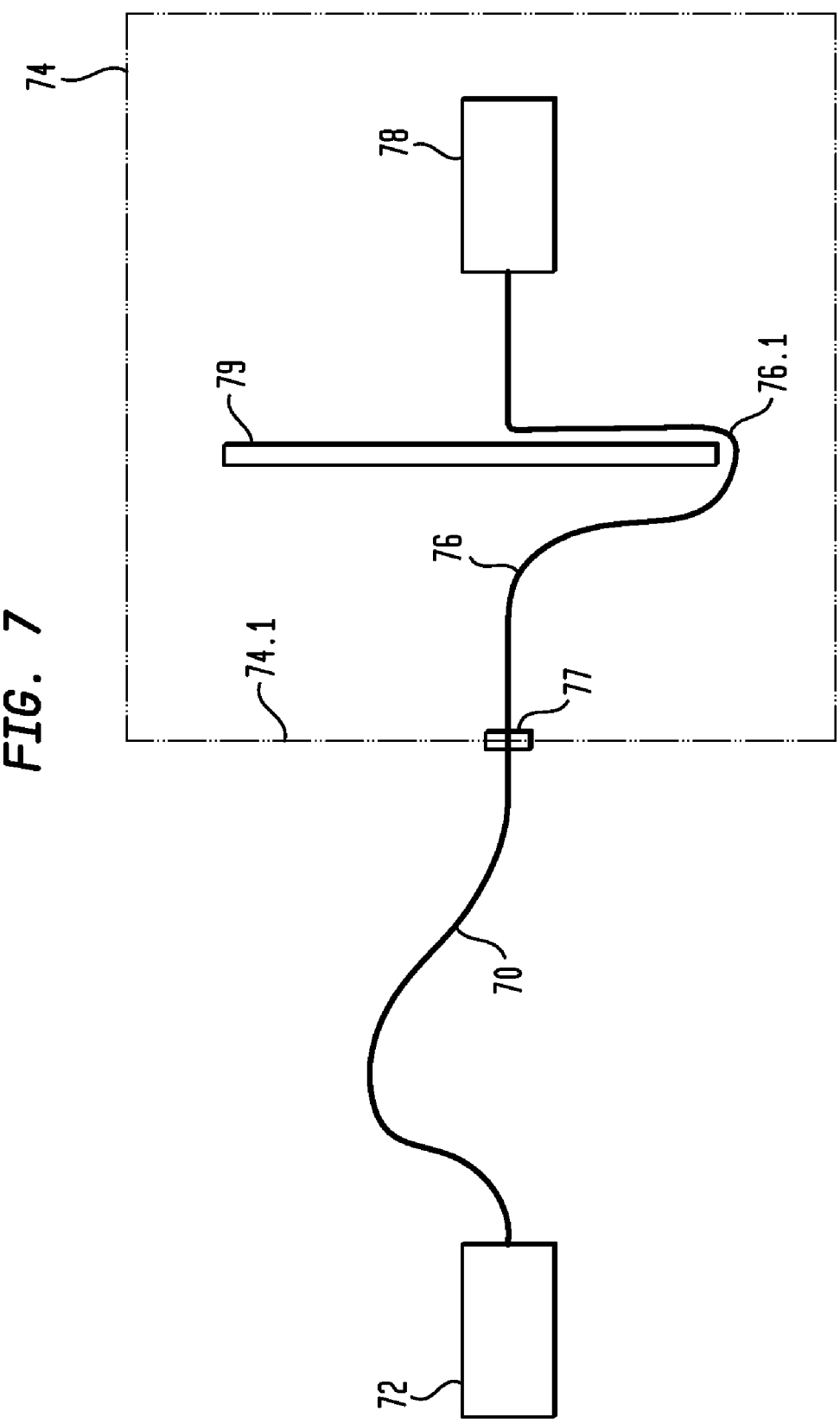

BEND INSENSITIVITY IN SINGLE MODE OPTICAL FIBERS

CROSS-REFERENCE TO RELATED APPLICATIONS

This application is a divisional of co-pending application Ser. No. 12/072,869 (Fini 9-5) filed Feb. 28, 2008 and entitled "Bend Insensitivity in Single Mode Optical Fibers," which is a continuation-in-part of application Ser. No. 11/818,780 (Fini 5), which was filed on Jun. 15, 2007 and is entitled "Bend-Insensitivity in Single Mode Optical Fibers." This application also claims priority from provisional application Ser. No. 61/030,713, which was filed on Feb. 22, 2008 and is entitled "Solid Ring-Assisted Fibers with Low Bend Loss."

BACKGROUND OF THE INVENTION

1. Field of the Invention

This invention relates to single mode optical fibers and, more particularly, to reducing bend sensitivity in such fibers. It also relates to fiber designs that are not only relatively bend insensitive but also effectively mode-matched to standard single mode fiber and/or have effectively cut off higher order transverse modes.

2. Discussion of the Related Art

In contrast with standard single mode optical fiber used, for example, in land line, undersea and metro systems, access fiber, which is typically located closer to the user, includes fiber-to the-home (FTTH), jumper cables, and FTTx fiber (e.g., fiber-to-the-curb, indoor wiring). Access fiber must not only interface in a low loss, reliable way with standard single mode fiber (SMF), which carries optical signals to the location being accessed (e.g., home, business, or other facility), but also must be relatively insensitive to the effects of bending, which is inherent in many of the access fiber applications.

More specifically, standard step index, SMF often has a core diameter of about 8-11 μm. SMF of this type illustratively complies with International Telecommunications Union-Telecommunications Sector Recommendation G.652. A typical fiber of this type, known as SMF 28, is commercially available from Corning Inc., Corning, N.Y. With diameters in this range and a core-cladding index contrast of about 0.005-0.007, such SMFs typically have an effective fundamental transverse mode-field-area ($A_{eff}$) of about 55-70 $\mu m^2$ at a wavelength of about 1300 nm and about 70-90 $\mu m^2$ at a wavelength of about 1550 nm. In order to efficiently couple (splice) such a SMF to an access fiber, the $A_{eff}$ of the access fiber should be as close to that of the SMF as practically possible.

In addition, however, some access fiber may have to be bent, for example, around the corners of walls and in wiring conduits or ducts. In many applications the required bend radius of the access fiber may be approximately 4-15 mm, and in some cases the lower limit may reflect even tighter bends (e.g., 2-3 mm radius). When fiber is bent so severely, however, optical loss may increase to unacceptable levels. In particular, the optical loss experienced by the fundamental transverse mode of a standard SMF, which may be within system specifications when the fiber is straight (or bent only slightly), is often much higher and out of specification when the same fiber is bent too much. In addition, if the optical signal contains any higher order transverse modes (HOMs), the bend loss experienced by such HOMs will be even higher than that suffered by the fundamental transverse mode.

As nature would have it, however, the design of an access fiber that has a $A_{eff}$ matched to that of a standard SMF and/or with HOMs effectively cutoff often conflicts with the design that achieves low bend loss in typical access environments.

Therefore, a need remains in the art for an access fiber design that has relatively low bend loss when bent to a radius of about 4-15 mm and simultaneously has a $A_{eff}$ matched to that of standard SMF and/or has HOMs effectively cutoff.

BRIEF SUMMARY OF THE INVENTION

In accordance with one embodiment of our invention, an optical fiber that is relatively insensitive to bend loss comprises a core region and a cladding region configured to support and guide the propagation of light in a fundamental transverse mode, the cladding region including (i) an outer cladding region having a refractive index less than that of the core region, (ii) an annular cladding pedestal region having a refractive index higher than that of the outer cladding region and comparable to that of the core region, and (iii) an annular cladding inner trench region disposed between the core region and the pedestal region, the inner trench region having a refractive index less than that of the outer cladding region. In an alternative embodiment, the cladding region also includes (iv) an annular cladding outer trench region disposed between the pedestal region and the outer cladding region, the outer trench region having a refractive index less than that of the outer cladding region. In either of these embodiments, in order to suppress HOMs the pedestal region is configured to resonantly couple at least one other transverse mode of the core region to at least one transverse mode of the pedestal region.

Fiber designed in accordance with our invention has relatively low bend sensitivity and is advantageously used as access fiber, but may have other applications, such as fibers used in sensors or in vehicles.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 2 is a schematic graph of the refractive index profile of a step-index-fiber (SIF) used to describe how $A_{\mathit{eff}}$ changes with the refractive index contrast ($\Delta n$) of the core region;

FIG. 3 is a schematic graph of the refractive index profile of a SIF used to describe how $A_{\mathit{eff}}$ changes with a width (e.g., the diameter, D) of the core region;

FIG. 4 shows schematic graph of the refractive index profiles of a SIF with an annular cladding region used to suppress higher order modes (HOMs); FIG. 4A demonstrates the case for a straight fiber; FIG. 4B for a bent fiber;

FIG. 5 is a graph of the refractive index profile of a fiber fabricated in accordance with the design of FIGS. 1A and 1B;

FIG. 6 is a graph of the refractive index profile of another fiber fabricated in accordance with the design of FIGS. 1A and 1B;

FIG. 7 is a schematic block diagram describing a generalized application of our access fibers;

Figure 1:
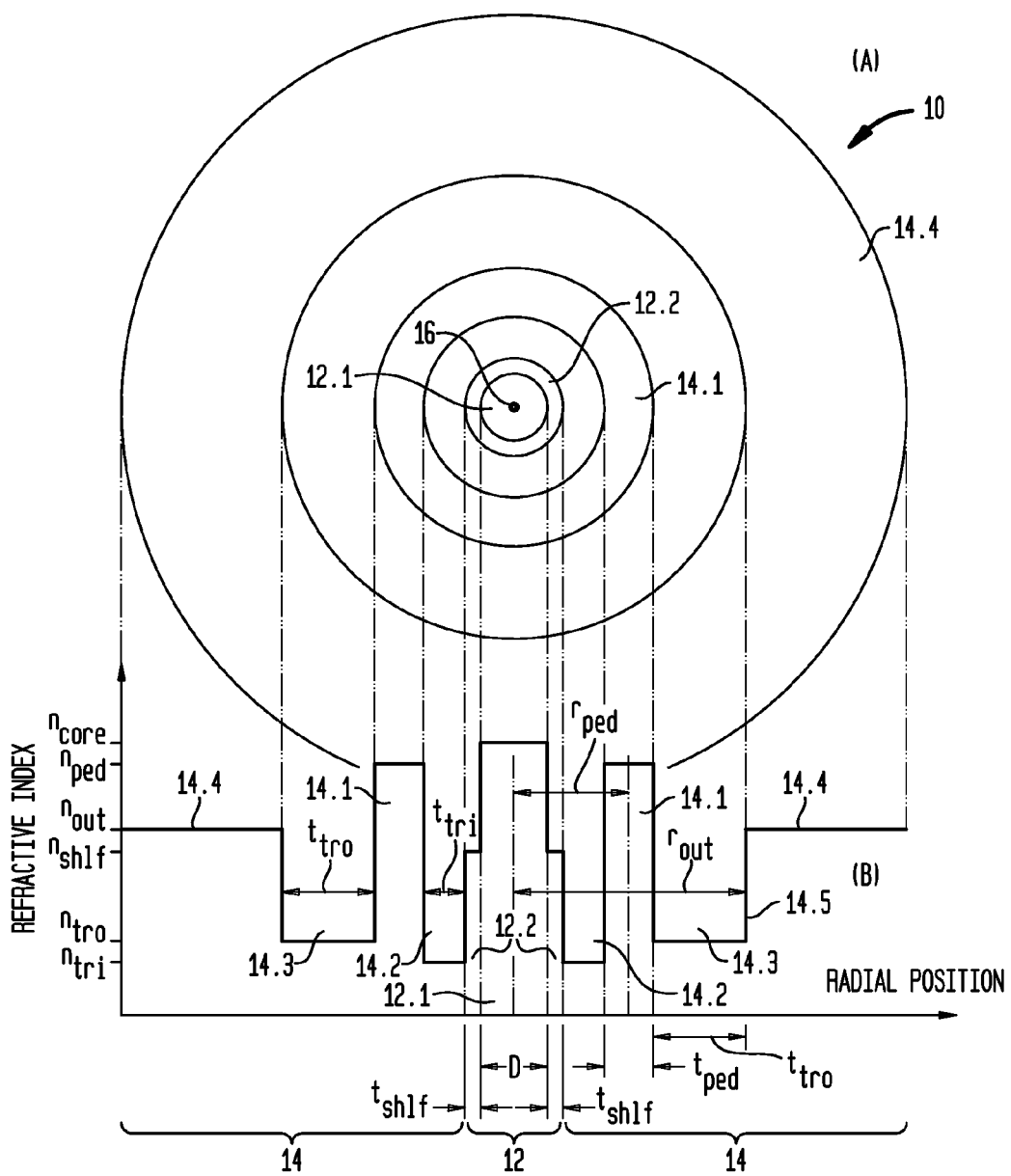
FIG. 1A is a schematic, cross-sectional view of an optical fiber in accordance with one embodiment of our invention.
FIG. 1B is a schematic graph of the refractive index profile of the fiber of FIG. 1A.
FIG. 1C is a schematic graph of the refractive index profile of another modified version of the fiber of FIG. 1A in which the outer trench is shallower, in accordance with another embodiment of our invention.
FIG. 1D is a schematic graph of the refractive index profile of a modified version of the fiber of FIG. 1A in which the outer trench has been omitted, in accordance with another embodiment of our invention.
FIG. 1E is a schematic, cross-sectional view of an optical fiber in accordance with one more embodiment of our invention in which the pedestal region (or ring) has lowered-index airholes and/or raised-index inclusions.
FIG. 1F is a schematic, cross-sectional view of an optical fiber in accordance with yet another embodiment of our invention in which the trenches include airholes.
FIG. 1G is a schematic, cross-sectional view of an optical fiber in accordance with another embodiment of our invention including multiple pedestal regions (or rings) and an annular scattering (or absorption) region near an outer ring to enhance mode discrimination.

Various ones of the foregoing figures are shown schematically in that they are not drawn to scale and/or, in the interests of simplicity and clarity of illustration, do not include all of the details of an actual optical fiber or product depicted. In particular, the index profiles of FIGS. 1-6 are averages of the actual variations of index that would be observable in an optical fiber.

Although the use of the term radius in the foregoing (and following) discussion implies that the cross-sections of the various regions (e.g., core, shelf, pedestal or ring, trench, airhole, inclusion) are circular and/or annular, in practice these regions may be non-circular; for example, they may be elliptical, polygonal, or other more complex shapes. Nevertheless, as is common in the art, we use the term radius for simplicity and clarity.

Hereinafter, the term mode(s) shall mean transverse mode(s), and the terms index and indices shall mean refractive index and refractive indices.

DETAILED DESCRIPTION OF THE INVENTION

The design of optical access fibers for typical practical applications involves consideration of three interrelated requirements: (i) relatively low bend loss (i.e., low bend sensitivity) for a bend radius within a predetermined range (e.g., 4-15 mm); (ii) suppression of HOMs (i.e., relatively low cutoff wavelength for the HOM(s) to be suppressed); and (iii) mode-area matching to standard SMF (e.g., good connectorization and/or splicing to standard fiber, such as SMF 28 commercially available from Corning, supra).

Optical Fiber Design—Bend Insensitivity Considerations

With reference now to FIGS. 1A and 1B, an optical fiber 10 in accordance with one aspect of our invention has relatively low bend loss and, as such, is suitable for a variety of access or sensor fiber applications. Fiber 10 includes a core region 12 surrounded by a cladding region 14, with the core and cladding regions being configured to support and guide the propagation of signal light (radiation) axially along a longitudinal axis 16 located at essentially the center of the core region 12.

Although signal light may actually crisscross axis 16 as it propagates along fiber 10, it is well understood in the art that the general direction of propagation is fairly stated as being along axis 16.

Moreover, although the core region 12 is depicted schematically as having a circular cross-section, which is often the preferred shape, it may also have other cross-sectional shapes such as elliptical or polygonal, as discussed above. In general, mode size is characterized by $A_{\mathit{eff}}$, but for circular core cross-sections typical of SMFs the mode-field diameter (MFD) may also be used.

In addition, although core region 12 is depicted as having a two-layer profile (i.e., a profile with two essentially constant or uniform index regions), it could also have a step-index, multi-step, or graded-index profile.

Fiber of this type is typically made of glass (e.g., silica) in which the refractive indices of the core region and of the cladding region are controlled by the amount and type of dopants (e.g., P, Al, Ge, F) incorporated therein during the fabrication of the fiber, as is well known in the art. These refractive indices, as well as the thicknesses/diameters of core/cladding regions, determine important operating parameters of the fiber, as discussed below.

In accordance with one embodiment of our invention, the cladding region 14 includes a an annular outer cladding region 14.4, an annular, elevated index, pedestal region 14.1, an annular, depressed index, inner trench region 14.2 disposed between the core region 12.1 and the pedestal region 14.1, and an annular, depressed index, outer trench region 14.3 disposed between the pedestal region 14.1 and the outer cladding region 14.4. The refractive index ($n_{ped}$) of the pedestal region 14.1 is higher than the refractive index ($n_{out}$) of the outer cladding region 14.4. In addition, the refractive indices ($n_{tri}$, $n_{tro}$) of both the inner and outer trench regions are lower than that of the outer cladding region 14.4; that is, $n_{ped} > n_{out}$, $n_{tri} < n_{out}$, and $n_{tro} < n_{out}$. As discussed below, the fiber 10 in general, and the pedestal region 14.1 in particular, is configured to suppress preselected HOMs.

In general, the inner and outer trench regions provide confinement of the various fiber modes. The amount or level of confinement for any mode near cutoff can be quantified by the expression $(n_{tr} - n_{out})t_{tr}$, where $n_{tr}$ and $t_{tr}$ are the index and thickness of a trench region. Preferably, the level of such confinement provided by each of the trench regions should satisfy the following condition:

$$0.5 < [(n_{tri} - n_{out})t_{tri}]/[(n_{tro} - n_{out})t_{tro}] < 2.0, \quad (1a)$$

where $t_{tri}$ and $t_{tro}$ are the thicknesses of the inner and outer trench regions, respectively.

In one embodiment, the core region 12 includes an inner core region 12.1 surrounded radially by an annular outer core region (or shelf region) 12.2. The index of the inner core region 12.1 is greater than that of the outer core region 12.2; that is, $n_{core} > n_{shlf}$. The shelf region 12.2 is optional but in some cases may be preferable. In designs where the shelf region is omitted, the core region 12 would simply include only the inner core region 12.1, with the thickness of the inner trench region 14.2 being increased by the width of the omitted shelf region. As discussed below, in either case, the core region 12 is configured to produce a fundamental mode $A_{\mathit{eff}}$ that matches that of a standard SMF.

Bend loss, of course, should be as low as possible. In particular, it should be less than that of a standard SMF at important operating wavelengths (e.g., 1300 nm, 1550 nm, and 1650 nm) for any bend radius in the range of approximately 4-15 mm. To this end, at least one trench region 14.2, 14.3 (and preferably both) should provide a total contrast much higher than that of a standard SMF. Illustratively, SMF 28 has a total contrast of about 0.005. In accordance with one embodiment of our invention, the total contrast of fiber 10 is given by $$|n_{tri}-n_{core}|>0.007, \text{ and/or} \qquad (1)$$

$$|n_{tro}-n_{core}|>0.007 \qquad (2)$$

Figure 1C:
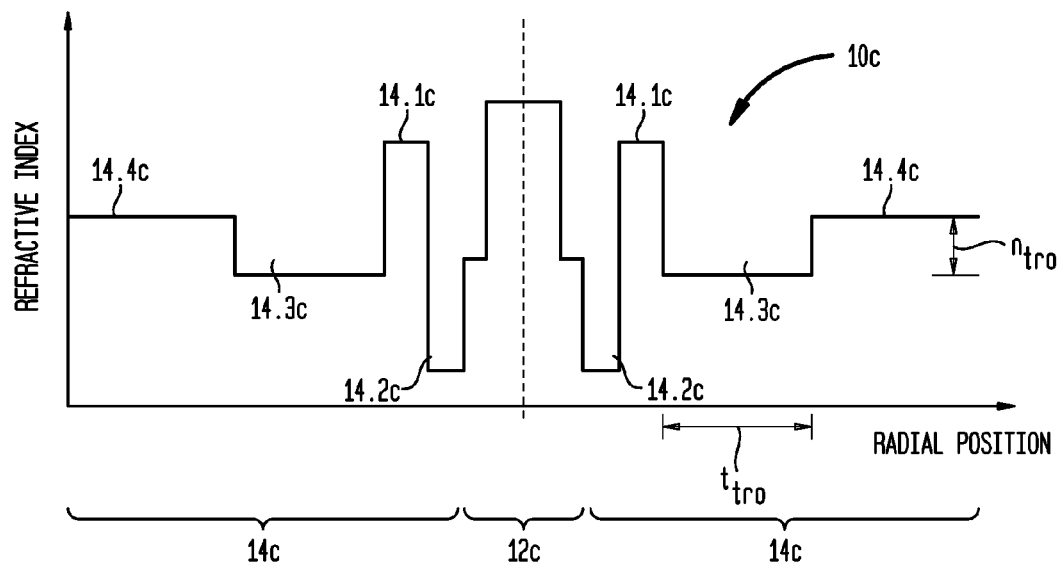

Illustratively at least the inner trench-to-core contrast of equation (1) is approximately 0.008-0.020, and preferably both the inner and outer trench-to-core contrasts satisfy this condition for all embodiments of our invention except the shallow-trench embodiment of FIG. 1C.

In addition, the interface 14.5 between the outer cladding region 14.4 and the outer trench region 14.3 should be at a radius in the range of approximately 17-23 μm (17-30 μm in the shallow-trench design, infra) for a bend radius of 4-15 mm, and the refractive index of the core and pedestal regions are comparable; that is, $$|n_{core}-n_{ped}|<0.003 \qquad (2a)$$

The outer trench region 14.3 of fiber 10, as shown in FIG. 1B, is depicted as being relatively narrow (radial thickness $t_{tro}$) and relatively deep (index $n_{tro} \ll n_{out}$). By deep we mean that $n_{tro}$ is more than about 0.0020 below $n_{out}$. The narrowness of outer trench region is not critical.

In contrast, in an alternative embodiment of our invention, as shown in index profile of FIG. 1C, the outer trench region 14.3c of fiber 10c is shallower. By shallow we mean $n_{tro}$ is less than about 0.0020 below $n_{out}$. The shallower trench region 14.3c is expected to improve manufacturability because the outer trench could be created using a down-doped substrate tube [e.g., a F-doped silica (glass) substrate tube] rather than a vapor-deposited glass. Use of a substrate tube would reduce the amount of vapor-deposited glass required to fabricate the fiber 10c, thereby reducing manufacturing cost.

In addition, FIG. 1C also depicts the shallow trench region 14.3c as being wider that the inner trench region 14.2c, but, as with the design of FIG. 1B, the width of the outer trench region 14.3c is not critical.

At first blush it appears that this shallow-trench design contravenes the design principle defined by equation (1a); that is, the level of confinement provided by each of the trenches should be roughly the same. In a large portion of the design space, combining a highly confining (deep) inner trench with a much less confining (shallower) outer trench gives relatively poor HOM suppression, in part because the ring modes of the pedestal region 14.1 become too lossy and too isolated from the core modes, which interferes with the very purpose (HOM suppression) of the pedestal region, discussed infra. However, I have found a design space where good performance is obtained despite the having two trenches with very dissimilar levels of confinement; that is, where:

$$[(n_{tri}-n_{out})t_{tri}]/[(n_{tro}-n_{out})t_{tro}]>2.0, \qquad (2b)$$

e.g., where the left hand side of equation (2b) is illustratively in the range of about 5-9. In this design space, pedestal modes are not well confined to the pedestal region; that is, they extend into the outer trench region and have large losses due to tunneling into the outer cladding. Poor confinement of the pedestal mode tends to degrade the HOM suppressing performance of these fibers, but this disadvantage is balanced by the enhanced bend loss performance of these designs. When bent, the pedestal modes of the fiber become extremely lossy making the fiber immune to the catastrophic loss effect discussed with reference to FIG. 4B below.

Figure 1D:
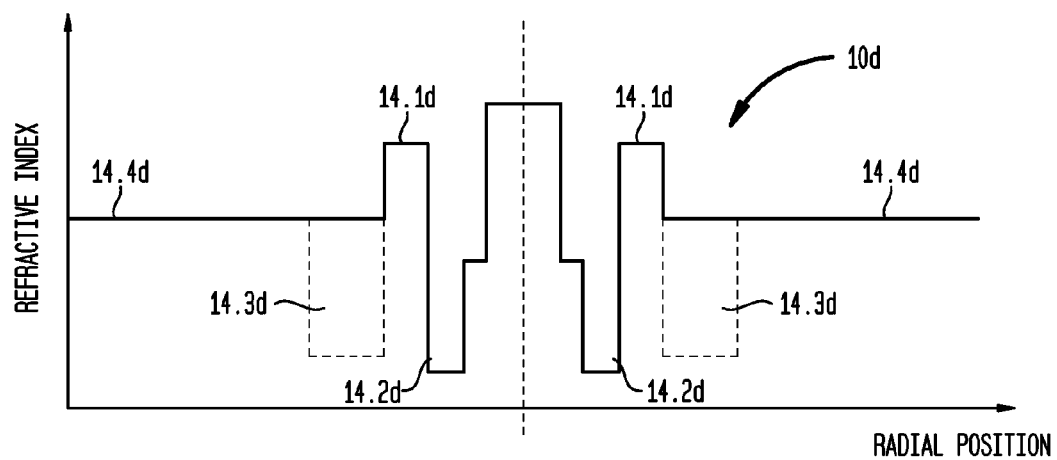

In another embodiment of our invention, as shown in fiber 10d of FIG. 1D, the outer trench may be omitted altogether; hence the outer trench 14.3d is shown in phantom. In this case, the pedestal region (or ring) 14.1d is located immediately adjacent the outer cladding 14.4d. In such a design, we recognize that even loose bending of the fiber can produce tunneling losses from a pedestal mode. In fact standard measurements and practices regarding cutoff consider a higher-order mode effectively suppressed if it shows large losses when the fiber is gently bent (typically with bend radius of about 40 mm). In order to provide efficient HOM suppression under conditions of loose bending, it is not necessary to provide a second trench through which the pedestal modes can tunnel. Instead, the pedestal region can be designed so that the pedestal modes see sufficient bend loss in a loose bend relevant to cutoff measurements (40 mm radius). Said another way, one can recognize that an as-fabricated fiber with no outer trench leads to an equivalent refractive index in loosely-bent operation that in effect has a shallow outer trench.

Figure 1E:
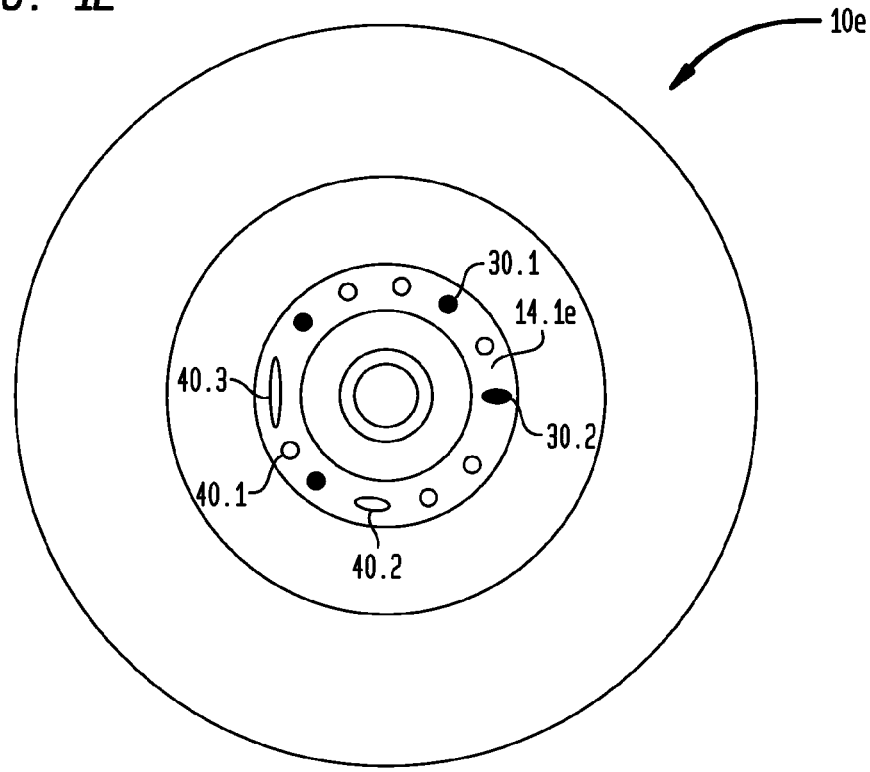
Figure 1F:
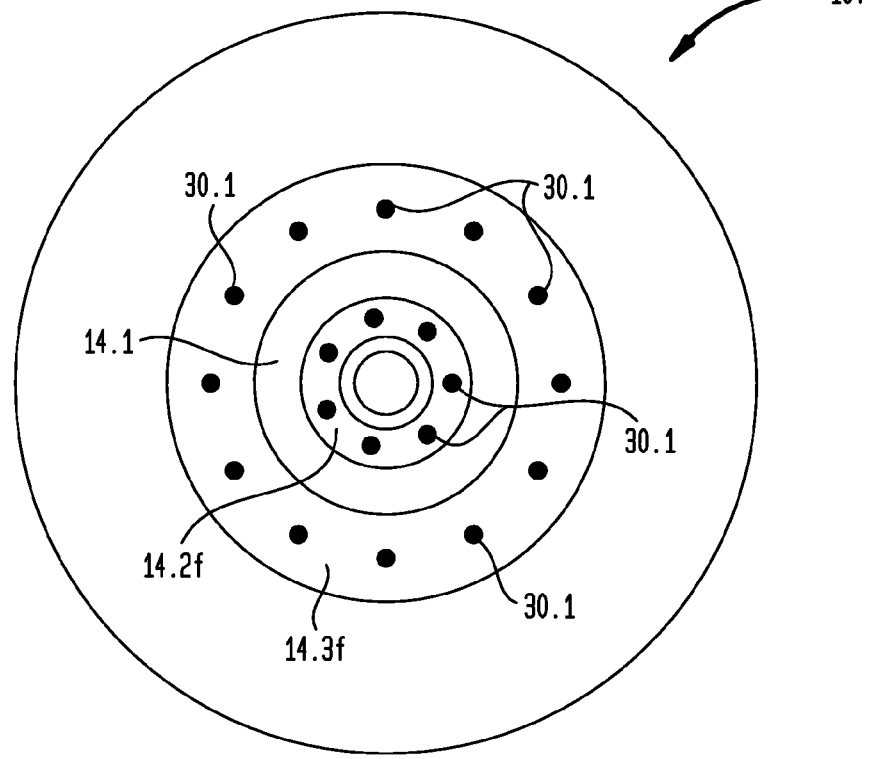

In any of these embodiments the pedestal region (or ring) may be formed in a straight-forward, well-known manner by introducing index-increasing dopants (e.g., Al, Ge, P in silica) into the region during vapor deposition. As illustrated by fiber 10 of FIGS. 1A-1B, in each radial cross-section of the fiber, the ring 14.1 would have a substantially uniform index circumferentially. However, as shown in fiber 10e of FIG. 1E, the index of ring 14.1e may be rendered non-uniform circumferentially by means of longitudinally extending, radially localized, well-known features such as index-lowering airholes 30.1, 30.2 and/or index-raising inclusions 40.1, 40.2, 40.3. As with the core, rings and trenches, these features may have various cross-sectional shapes including circles (30.1, 40.1), ellipses (30.2, 40.2, 40.3) and polygons (not shown). In such designs, the principle of HOM suppression is still that pedestal modes efficiently couple to unwanted core-guided modes when their effective indices are nearly the same. The effective index of pedestal modes can be calculated and index-matched using standard methods for fibers with arbitrary cross-section, and so the designs are conceptually the same as for the special case of an annulus having an essentially uniform or constant index. However, the use of features with desirable shapes may provide advantages; for example, they may provide index-matching over a wider wavelength range than is possible for a uniform-index annulus.

Alternatively, the pedestal region may be a virtual ring; that is, the ring 14e need not have a well-defined circumferential (annular) boundaries formed by standard doping during vapor deposition. Instead, the pedestal region may be formed entirely by a suitably placed array of features: airholes, inclusions, or both.

In a similar fashion, as shown in fiber 10f of FIG. 10F, the inner trench 14.2f and/or the outer trench 14.3f may include an array of suitably spaced airholes that decrease the effective index seen by the propagating signal mode.

Figure 1G:
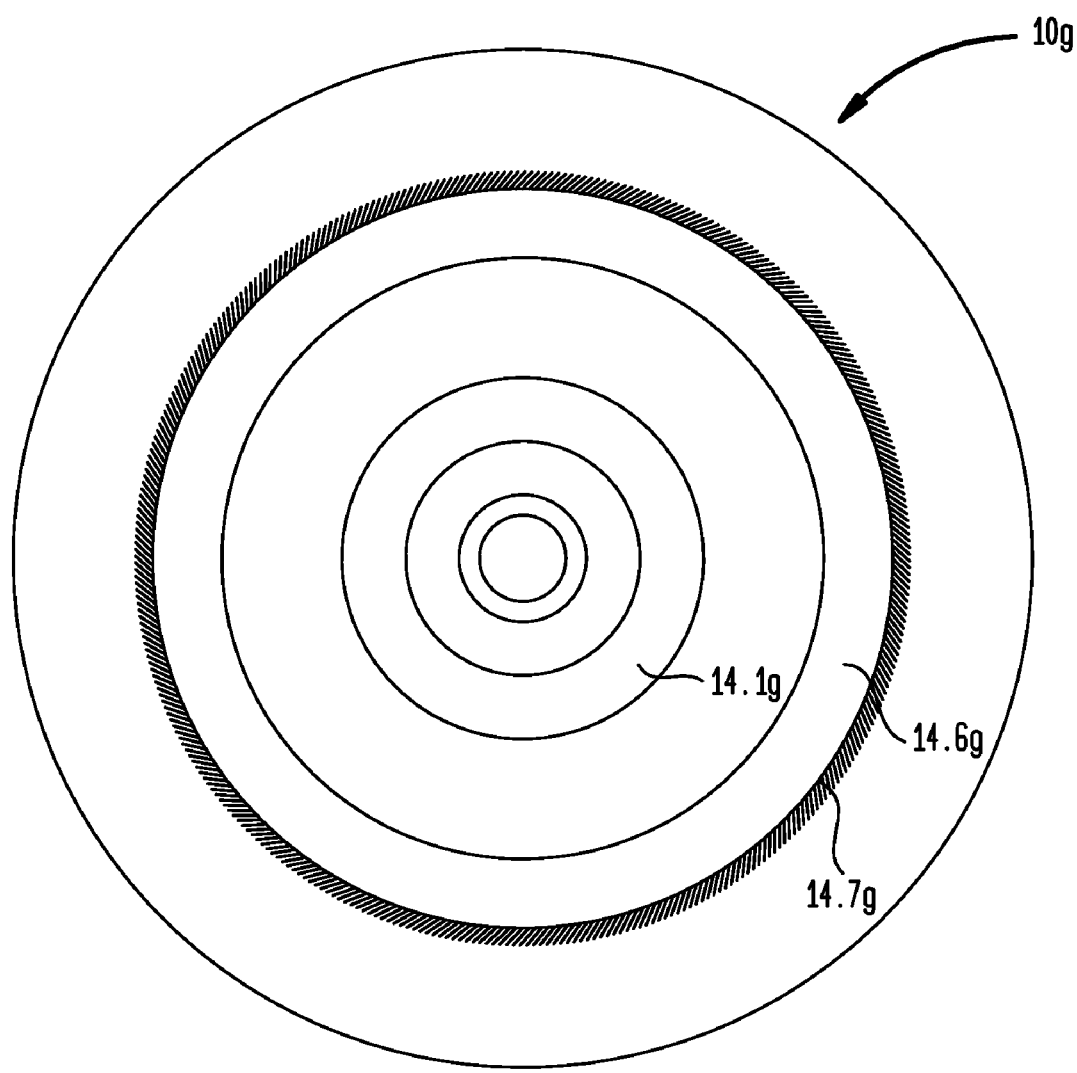

Finally, the fiber 10g depicted in FIG. 1G may also include multiple rings 14.1g and 14.6g. Only two such rings are shown for purposes of illustration. Further, it may be advantageous to include a loss region 14.7g of scattering or absorption centers, for example, adjacent the outer ring 14.6g. Positioning the loss region 14.7g near ring 14.1g or 14.6g provides an alternative loss mechanism to the tunneling losses. It may enhance mode discrimination or remove constraints that could lead to easier fabrication. For example, if pedestal modes have a desirable level of scattering or absorption losses, tunneling losses are not needed, and the outer trench region might be eliminated. Absorption can be introduced by intentionally including materials in the glass that cause optical loss, or simply by using available "lower quality" glass known to have appropriately high loss.

Optical Fiber Design—Mode Matching Considerations

Because access fiber applications often entail splicing or otherwise coupling the access fiber to a standard single mode transmission fiber, it is important that the $A_{eff}$ of the access fiber be matched to that of the standard SMF (e.g., the standard SMF 28 fiber available from Corning, supra). In current practice, this requirement means that the access fiber should also be effectively single-moded and should have an $A_{eff}$ of about 70-90 $\mu m^2$ at signal wavelengths of approximately 1550 nm and an $A_{eff}$ of about 55-70 $\mu m^2$ at signal wavelengths of approximately 1300 nm. Typically, for an access fiber core region having a circular cross-section, the access fiber should have a core diameter of about 8-11 $\mu m$ approximately.

For simplicity the following exposition will focus on the design of fiber 10 of FIGS. 1A-1B. However, it will apparent to those skilled in the art that similar considerations apply to the alternative embodiments of FIGS. 1C-1G. The $A_{eff}$ of fiber 10 is controlled primarily by two parameters: the index contrast $\Delta n$ between the core region 12.1 and the inner trench region 14.2; that is, $\Delta n=(n_{core}-n_{tri})$ and a radial width or core area of the core region 12; that is, in the case of a circular cross-section, the diameter D of the core region, but in the case of a non-circular cross-section, the core area. More specifically, as shown in FIG. 2, for a given D, when the index contrast is decreased from $\Delta n_2$ to $\Delta n_1$, the confinement of the fundamental mode field decreases, which means that its $A_{eff}$ increases. However, reduced mode confinement means the fiber acts as a poorer waveguide and optical losses increase, particularly when the fiber is subject to sharp bends (e.g., a bend radius of 4-15 mm). On the other hand, as shown in FIG. 3, for a given $\Delta n$, when the diameter of the core region 12 increases from $D_1$ to $D_2$, the $A_{eff}$ increases (roughly as diameter squared), but the number of HOMs supported also increases. In general, the presence of significant energy in HOMs may be undesirable; for example, optical loss increases if the fiber is subject to bending.

In the embodiment of FIG. 1 in which the outer core region (or shelf) 12.2 is omitted, the total contrast (i.e., $n_{core}-n_{tri}$, or $n_{core}-n_{tro}$, or both) should still satisfy inequalities (1) and/or (2), a core width (e.g., diameter D) should be in the range of approximately $$8 \, \mu m \leq D \leq 11 \, \mu m, \quad (3)$$

and the index of the outer cladding region 14.4 should satisfy $$0.003 \leq (n_{core}-n_{out}) \leq 0.006 \quad (4)$$

approximately. Note, if this contrast is too high, HOMs tend to be introduced in the core region, which, however, are suppressed using the design described in the following section.

An alternative fiber design for meeting the conflicting requirements of reducing bend loss and matching $A_{eff}$ to that of standard SMF is also shown in FIG. 1. More specifically, the core region 12 includes a thin, lower index, annular, shelf region 12.2 surrounding inner core region 12.1, as shown in FIG. 1. Shelf region 12.2 allows the $A_{eff}$ to be increased to match that of a standard SMF. The shelf region 12.2 has a thickness $t_{shlf}$ which is much less than the diameter D of the inner core region 12.1. Illustratively, $D \gg t_{shlf}$ and $$1.0 \, \mu m \leq t_{shlf} \leq 4.0 \, \mu m \quad (5)$$

approximately when $D=8-11$ $\mu m$. In addition, the index $n_{shlf}$ of the shelf region 12.2 is less than that of the inner core region 12.1; that is, $n_{shlf} < n_{core}$. Typically, $(n_{core}-n_{shlf}) < 0.007$ approximately, which is similar to the index contrast (0.005) of standard SMF. Preferably, $n_{shlf}$ satisfies the following inequalities $$0.003 \leq (n_{core}-n_{shlf}) \leq 0.007, \text{ and} \quad (6)$$

$$|n_{shlf}-n_{out}| \leq 0.002 \quad (6a)$$

approximately, and D is the range of approximately 8-10 $\mu m$.

The foregoing design details of the core region 12 facilitate not only mode matching but also HOM suppression, which is discussed in the following section.

Optical Fiber Design—HOM Considerations

In order to suppress HOMs, the cladding region 14 of fiber 10 includes pedestal region 14.1, which has a higher index $n_{ped}$ than the remainder of the cladding region; that is, the pedestal region 14.1 is bounded radially by at least a lower index ($n_{tri}$) inner trench region 14.2 and, in some embodiments, also by a lower index ($n_{tro}$) outer trench region 14.3. In addition, it has a higher index than the index ($n_{out}$) of the outer cladding region 14.4. In the discussion that follows, it is assumed for purposes of exposition a dual-trench design, with the understanding that similar principles apply to the single (inner)-trench design.

The pedestal region 14.1 is configured so that at least one of its (ring) modes resonantly couples with at least one HOM of the core region 12. As shown in the simplified index profile of FIG. 4A, preferably HOM 18 (illustratively depicted as a $1^{st}$-order mode) of the core region 12 is resonant with a mode 20 of the pedestal region 14.1, whereas the fundamental mode 22 of the core region is not resonant with any mode of the pedestal region. The mode 20 is typically one of the ring modes of pedestal region 14.1 with the highest or nearly the highest effective index, and the mode 20 is not forbidden by well-known symmetry principles from coupling to the HOM of the core region.

By the terms resonant or resonantly coupled I mean that the effective refractive index ($n_{eff}$) of a mode in the core region is essentially equal to that of a mode in the pedestal region. Thus, the $n_{eff}$ 18.1 of the $1^{st}$-order mode 18 of the core region 12 is essentially equal to the $n_{eff}$ 20.1 of the mode 20 of the pedestal region 14.1, which allows energy in HOM 18 to transfer or couple (arrow 24) from the core region into mode 20 of the pedestal region and from there to radiate into the outer cladding region 14.4. (Arrow 26 indicates such radiation via leaky cladding modes, which are usually present. Alternatively, this energy may be lost due to absorption, scattering, etc.) After a suitable propagation distance along the fiber, this process of resonant transfer and radiation effectively suppresses HOM 18 in the core region. In contrast, $n_{eff}$ 22.1 of the fundamental mode 22 of the core region does not correspond to the $n_{eff}$ of any mode in the pedestal region. Consequently, the fundamental mode 22 propagates effectively in the core region, and no resonant transfer of its energy (negated arrow 28) into the pedestal region takes place.

The condition that a core region mode and a pedestal region mode have essentially equal refractive indices means, for example, that the core region HOM index 18.1 and the pedestal region mode index 20.1 are not so different that coupling of light between these modes is significantly frustrated. In a preferred embodiment of the invention, the difference between indices 18.1 and 20.1 is much less than the difference between the core fundamental mode index 22.1 and the pedestal mode index 20.1.

Proper coupling between the core region mode to be suppressed and the resonant pedestal region mode should also take into account the need to reduce coupling of the latter pedestal mode back into the former core mode.

The fiber 10 should also be configured to allow effective leakage of unwanted core modes through the pedestal modes. In this regard, see the discussion above in conjunction with equations (2a) and (2b).

In addition, the coupling between the core region and the pedestal region should not be so large that the desired (fundamental) core mode is disrupted. On the other hand, the coupling between the core region and the pedestal region should not be too small that unwanted core modes will not couple sufficiently to pedestal modes to be suppressed. Next, the leakage rate of the pedestal mode should not be so large that coupling between the core and pedestal region is frustrated (i.e., insufficient). Finally, the leakage rate of the pedestal mode should not be so small that unwanted core modes will experience too little loss to be effectively suppressed.

Adherence to these design principles assures that in the core region 12, for example, fundamental mode 22 is effectively propagated, whereas HOM 18 is effectively suppressed. The degree to which the HOM needs to be suppressed (or cut-off) depends on the particular application. Total or complete suppression is not demanded by many applications, which implies that the continued presence of a relatively low intensity HOM may be tolerable. In any event, suppressing HOMs improves system performance by, for example, reducing total insertion loss, lowering noise in the signal mode, and lowering microbend loss.

Figure 8:
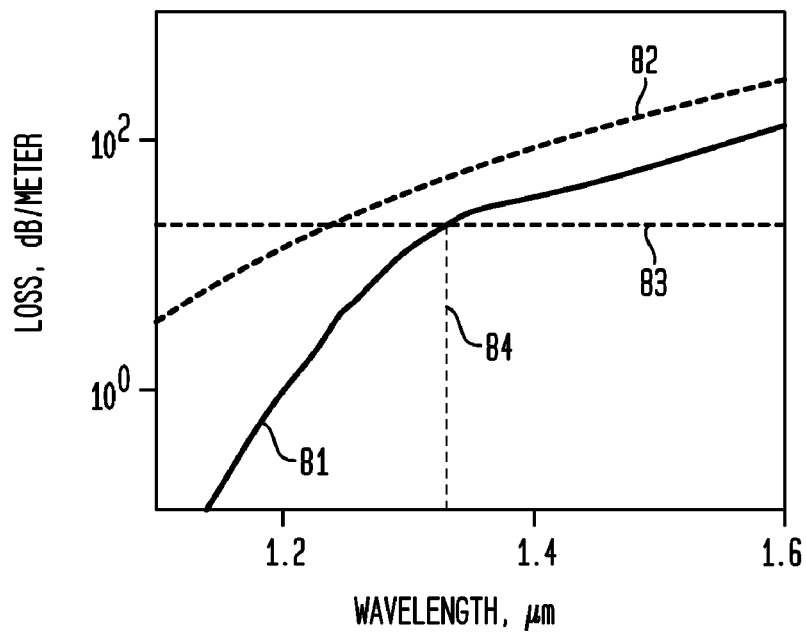
FIG. 8 is a graph of confinement (tunneling) loss vs. wavelength for selected modes of an idealized dual trench fiber, which exhibits HOM suppression over a broad wavelength range in accordance with one embodiment of our invention.

When our dual trench, ring fiber is properly designed to effect index matching (or resonance) between unwanted HOM core modes and particular ring modes, then the slope of core mode and ring mode index curves is nearly the same, especially in the region where they intersect. Consequently, index-matched coupling between the core and ring modes is achieved over a relatively wide wavelength range. The broadband nature of HOM suppression is illustrated by reference to FIG. 8, where confinement (or tunneling) loss is plotted vs. wavelength, and cutoff is defined by a mode loss greater than 20 dB/m (line 83). (The threshold of 20 dB/m is illustrative only; to estimate a measured cutoff, this threshold should depend on the length of the fiber used in the measurement.) FIG. 8 indicates that HOMs (curve 81) are cutoff over a broadband covering all wavelengths above about 1320 nm (line 84). The dashed curve 82 shows the pure ring mode loss—the calculated loss that ring modes would see in the absence of the core. A characteristic of resonant mode suppression is that the modes coupled to the lossy ring modes share their loss. The core HOM loss 81 is within a factor of 2-3 of the pure ring mode loss in the wavelength range where the modes are index matched.

The effect of bending on the fiber of FIG. 4A is shown in FIG. 4B. The index profile 4A before bending is skewed as shown by profile 4B, resulting in an increase in $n_{eff}$ 20.1$b$ of the mode 20 of the pedestal region 14.1. If the bend radius is sufficiently small, the cladding mode 20 may become resonant with the fundamental mode 22 of the core region 12, as shown by arrow 30. Such resonance would disadvantageously increase the optical loss of the fundamental core mode 22. Accordingly, the pedestal region 14.1 needs to be configured to accommodate the expected bend radius without causing the fundamental core mode 22 to be resonant with any cladding mode, in particular with the cladding mode 20.

The foregoing principles of resonant coupling (index matching) may also be applied to the suppression of multiple unwanted core modes either by resonantly coupling them to a single, mode of a pedestal region or by resonantly coupling them to different modes of one or more pedestal regions, each core mode being resonant with a separate pedestal mode.

Fiber Design Principles

Important parameters in the design of fiber 10 include the index ($n_{core}$) and radius ($r_{core}$=D/2) of the inner core region 12.1, the index ($n_{shlf}$) and thickness ($t_{shlf}$) of the annular core (shelf) region 12.2 (if present), the index ($n_{ped}$), radius ($r_{ped}$) and thickness ($t_{ped}$) of the pedestal region 14.1, the index ($n_{tro}$) and thickness ($t_{tro}$) of the outer trench region 14.3, and the index ($n_{tri}$) and thickness ($t_{tri}$) of the inner trench region 14.2.

To satisfy typical low bend loss and high $A_{eff}$ requirements requires tradeoffs. Low bend loss implies high index contrast, whereas high contrast implies low $A_{eff}$. One compromise is to have a low contrast core region (relative to the shelf region). As mentioned previously, this condition translates into ($n_{core}-n_{shlf}$) satisfying inequality (6). Illustratively, ($n_{core}-n_{shlf}$)~0.005. In addition, the inner trench region 14.2 should not impact the $A_{eff}$ too much, which means that the shelf region 12.2 (if present) should not be too thin; that is, it should satisfy inequality (5).

On the other hand, from the perspective of bend loss, the thickness and index of the inner trench region 14.2 are very important. Increasing the width (or thickness) of the inner trench region reduces bend loss but also tends to increase the presence of unwanted HOMs.

The presence of HOMs may also significantly impair performance, for example, through multi-path interference. Thus, the aspects of our fiber design related to HOM suppression are also significant factors in achieving low bend loss fibers that simultaneously satisfy other telecommunication system requirements. In general, as discussed previously, HOMs are suppressed by satisfying a resonance condition between a higher order (e.g., $1^{st}$ order) core mode to be suppressed and a pedestal ring mode; that is, the effective refractive indices of these two modes should be approximately equal to one another. In this regard, particular attention should be paid to the index difference ($n_{core}-n_{ped}$) between the inner core region 12.1 and the pedestal region 14.1, as well as the ratio $t_{ped}/r_{core}$ of the thickness of the pedestal region to the radius of the inner core region. For $n_{core}\sim n_{ped}$ this index matching condition may be satisfied with $t_{ped}$ in the range of approximately 1-4 μm. Index matching will generally require a smaller thickness $t_{ped}$ if $n_{core}<n_{ped}$ but a larger $t_{ped}$ if $n_{core}>n_{ped}$.

Bend loss is also related to the bend radius; that is, in general, the tighter the bend (smaller bend radius), the higher the optical losses. However, as discussed previously, there is a critical bend radius ($r_{crit}$) at which the fundamental core mode is resonant with a pedestal ring mode. The ring mode index of the pedestal (ring) mode is shifted by an amount given by $$\Delta n_{ped} = cn_{ped}r_{ped}/r_{bend} \qquad (8)$$

where c is a constant given approximately by $$0.8 \leq c \leq 1.0. \qquad (9)$$

The critical radius ($r_{crit}$) is approximately the radius $r_{bend}$ at which $\Delta n_{ped}$ is equal to the mode spacing $\Delta n_{ms}$ between the fundamental core mode 22.1 (FIG. 4A) and the higher-order core mode 18.1 (FIG. 4A):

$$r_{bend} > r_{crit} \sim cn_{ped}r_{ped}/\Delta n_{ms}. \qquad (10)$$

At $r_{bend}=r_{crit}$ the optical loss experienced by the fundamental core mode is extremely high; that is, the fundamental core mode is effectively suppressed, a highly undesirable circumstance. To alleviate this problem the radius ($r_{ped}$) of the pedestal region 14.1 can be reduced, resulting in a smaller critical bend radius until the bend radius required for operation is larger than the critical radius. In practice, reduction of $r_{ped}$ may be accompanied by increasing the inner trench depth, in order to provide large confinement of the inner trench in a reduced thickness.

An additional design principle of our invention relates to the potential problem of fundamental cutoff. More specifically, fibers according to the present invention have a deep inner trench region near the core region and consequently are prone to a potential problem of large tunneling losses at long wavelengths. The fundamental cutoff effect can be described as follows: at long wavelengths, the fundamental mode penetrates further into the inner trench region than at short wavelengths, causing the effective index of the fundamental mode to drop below the outer cladding index. The fundamental mode has tunneling loss that increases at longer wavelengths. The remedy for this potential problem can be thought of as a constraint on the outer cladding index, which strongly influences the tunneling loss and might otherwise be adjusted to increase the loss of higher-order modes. In accordance with this aspect of our invention, the outer cladding index should be low enough that fundamental tunneling loss is negligible for all signal wavelengths intended for transmission, which commonly includes 1550 nm, and for many systems includes even longer wavelengths such as 1625 nm. To achieve this desirable result the outer cladding index should be lower than the effective index of the fundamental mode at the longest signal wavelength required by the particular application ($n_{out}=n_{long}$, for example at 1625 nm). Our simulations and measurements have indicated that fundamental tunneling loss very quickly becomes unacceptable at around this level of outer cladding index, and so a somewhat stricter level at least 0.001 lower ($n_{out}<n_{long}-0.001$) is prudent, to allow room for manufacturing variability.

Experimental Results

These examples describe bend-insensitive preforms, as well as silica optical fibers drawn from the preforms, in accordance with the illustrative embodiment of our invention in which the core region 12 includes both an inner core region 12.1 and an annular core region 12.2 radially surrounding the inner core region. Well known MCVD was used to fabricate the fibers from silica glass and were doped with Ge in inner core region 12.1, F in annular core region 12.2, F in inner trench region 14.2, Ge in pedestal region 14.1, and F in outer trench region 14.3. Outer cladding region 14.4 was undoped. The as-drawn fibers of Example I and II had the index contrast profiles shown in FIGS. 5 and 6. The target profiles are shown by the dashed line traces 5.1 and 5.2, whereas the actual profiles are shown by solid line traces 6.1 and 6.2. The radial position axis (abscissa) gives the actual thickness/radius of the various fiber components: inner core region, shelf region, trench regions, and pedestal region.

Various materials, dimensions and operating conditions are provided by way of illustration only and, unless otherwise expressly stated, are not intended to limit the scope of the invention.

Example I

In this example, the fiber preform had a diameter of 18.8 mm, and the drawn fibers had an outside diameter (OD) of either 119 μm or 125 μm. The various radial components had thickness/radius and index contrast (Δn) relative to the outer cladding region as listed below in Table 1 for the fiber having a 125 μm OD:

TABLE 1

| FIBER REGION | THICKNESS (μm) | RADIUS (μm) | Δn |
|---|---|---|---|
| Inner core | | 4.9 | 0.005 |
| Shelf | 2.9 | | −0.004 |
| Inner trench | 4.3 | | −0.008 |
| Pedestal | 3.2 | 13.7 | 0.004 |
| Outer trench | 6.8 | | −0.008 |
| Outer cladding | | 22 | 0.000 |

The two fibers were characterized in terms of their cutoff wavelengths, bend loss (at a bend radius of 5 mm and at a wavelength of 1650 nm), and MFD (at a wavelength of 1550 nm), as indicated below in Table 2:

TABLE 2

| FIBER OD (μm) | CUTOFF (nm) | BEND LOSS (dB/m) | MFD (μm) |
|---|---|---|---|
| 119 | 1445 | <0.5 | 8.8 |
| 125 | 1505 | <0.8 | 9.2 |

The 125-μm-OD fiber showed no impairment on preliminary CATV tests, despite the relatively high cutoff (1505 nm cutoff wavelength; 1553 nm signal wavelength).

The condition $r_{bend}>r_{crit}$ given by inequality (10) in this case is satisfied as follows. Depending on the value of the constant c=0.8-1.0, $r_{crit}$ is calculated as being in the range 4.6-5.8 mm. Using the better estimate of c=0.8, we get $r_{crit}=4.6$ mm. As is expected, there was a rapid degradation of performance of this fiber when $r_{bend}$ was made smaller than about 5 mm. (The coefficient value c=0.8 is better because it includes a stress correction known in the art.)

We note there that the fiber of Example I does not satisfy the conditions defined by inequality (6). However, Example II does, which accounts in part for its improved performance.

Example II

In this example, the fiber preform had a diameter of 19 mm, and the drawn fiber had an outside diameter (OD) of 125 μm. The various radial components had thickness/radius and index contrast (Δn) relative to the outer cladding region as listed below in Table 3:

TABLE 3

| FIBER REGION | THICKNESS (μm) | RADIUS (μm) | Δn |
|---|---|---|---|
| Inner core | | 4.2 | 0.004 |
| Shelf | 1.6 | | −0.001 |
| Inner trench | 5.7 | | −0.005 |
| Pedestal | 2.3 | 12.7 | 0.003 |
| Outer trench | 7.1 | | −0.005 |
| Outer cladding | | 21 | 0.000 |

The fiber was characterized in terms of its cutoff wavelength, bend loss of 1 dB/m (at a bend radius of 6.25 mm and wavelength of 1550 nm), and MFD of 8.6 μm and 9.2 μm (at wavelengths 1310 nm and 1550 nm, respectively), as follows:

This fiber had a significantly lower cutoff of 1304 nm determined by ITU-2m measurement than either fiber of Example I. Some customers currently require a larger MFD and/or a cutoff <1260 nm, which can be attained by sacrificing bend loss. Example III below addresses such a fiber design.

At 1320 nm the fiber compares favorably to the ITU G.652 MFD requirement of >8.6 μm at 1310 nm.

This fiber also showed negligible MPI (multi-path interference) in the C-band.

Splicing with dopant diffusion: <0.5 dB/splice at 1550 nm.

Connectorization: 0.05 dB<excess loss <0.1 dB. The excess loss appears to be due to loss introduced by the connectorization technique/design employed.

Examples III, IV, V

This set of examples illustrates several different embodiments of our invention: Example III—a fiber having a dual-trench, ring design (akin to FIG. 1B) in which the inner and outer trench regions are both relatively deep and have essentially the same index depth; Example IV—a very high performance fiber having a dual-trench, ring design (akin to FIG. 1B) in which the inner and outer trench regions are both relatively deep but the inner trench region is deeper than the outer trench region; and Example V—a fiber having a dual trench, ring design (akin to FIG. 1C) in which the outer trench region is much shallower than the inner trench region. Examples III-V are defined more specifically by the index profile parameters shown in Table 4 below:

TABLE 4

| Ex. | $r_{core}$ | $\Delta n_{core}$ | $t_{shelf}$ | $\Delta n_{shlf}$ | $t_{tri}$ | $\Delta n_{tri}$ | $t_{ped}$ | $\Delta n_{ped}$ | $t_{tro}$ | $\Delta n_{tro}$ | $r_{ped}$ |
|---|---|---|---|---|---|---|---|---|---|---|---|
| III | 4.4 | 0.0039 | 2.2 | −0.0004 | 4.7 | −0.0057 | 2.6 | 0.0039 | 7.2 | −0.0057 | 12.6 |
| IV | 4.5 | 0.0041 | 2.3 | −0.0010 | 4.0 | −0.0097 | 3.0 | 0.0036 | 8.6 | −0.0060 | 12.3 |
| V | 4.6 | 0.0042 | 1.9 | 0.0000 | 9.2 | −0.0060 | 1.7 | 0.0051 | 12.1 | −0.0008 | 16.5 |

Fibers based on parameters of Examples III and IV have been fabricated and measured, resulting in the optical properties shown in Table 5 below:

TABLE 5

| Ex. | MFD at 1310 nm | Bend Loss at 1550 nm (4.8 mm cable bend radius) | Standard Cable Cutoff (22 m fiber length) | Jumper Cable Cutoff (2 m fiber length) |
|---|---|---|---|---|
| III | 8.9 μm | 0.025 dB/turn | 1222 nm | 1253 nm, |
| IV | 8.6 μm | 0.010 dB/turn | 1210 nm | 1440 nm |

Our dual-trench, ring fibers represent a broad new design strategy—we have designed several such fibers to accommodate different application requirements, each demonstrating greatly improved performance over conventional design strategies. Measured properties for two fibers (Examples III and IV) are shown in Table 5 and illustrate the tradeoff between cutoff and bend loss. Cable measurements were performed on standard riser-rated cordage with an outer diameter of 4.7 mm (so that 4.8 mm cable bend radius is equivalent to 7.1 mm fiber bend radius). Fiber IV had lower bend loss and meets the MFD requirement (8.6 μm) and the cable cutoff requirement (1260 nm) of the G.652 standard. The bend loss was very low (<0.07 dB/turn) even down to 5 mm mandrel diameter (for cable, equivalent to bare-fiber diameter of 10 mm). For still tighter bends, long-term mechanical reliability could become an issue, so that the ultra-low bend sensitivity of some prior art designs [e.g., K. Himeno et al., *J. Lightwave Technol.*, Vol. 23, p. 3494 (2005)] may offer little advantage. However, if the cable cutoff is measured on a short, 2 m-length of fiber (instead of the standard 22 m measurement), HOM loss is not sufficient in fiber IV to maintain a cutoff below 1260 nm.

This highlights the need to rethink measurement methods and standards for low-bend loss fibers; that is, a fiber that meets the G.652 cutoff requirement might nevertheless experience significant multi-path interference (MPI) if it is used in short-length jumpers. This issue in not unique to dual-trench, ring fibers, but arises in many designs with a single trench (but no ring) or with hole-assistance as well.

Fiber III had somewhat higher bend loss but had a much better 2 m-cable cutoff, indicating that there should be no MPI issues at ~1300 nm transmission wavelengths, even for short jumpers. It also had a larger MFD. We measured typical splice losses below 0.1 dB at 1550 nm when this fiber was spliced to standard SMF using a standard splice program on Fujikura FSM-30S. Attenuation for both fibers was less than 0.20 dB/km at 1550 nm.

Figure 9:
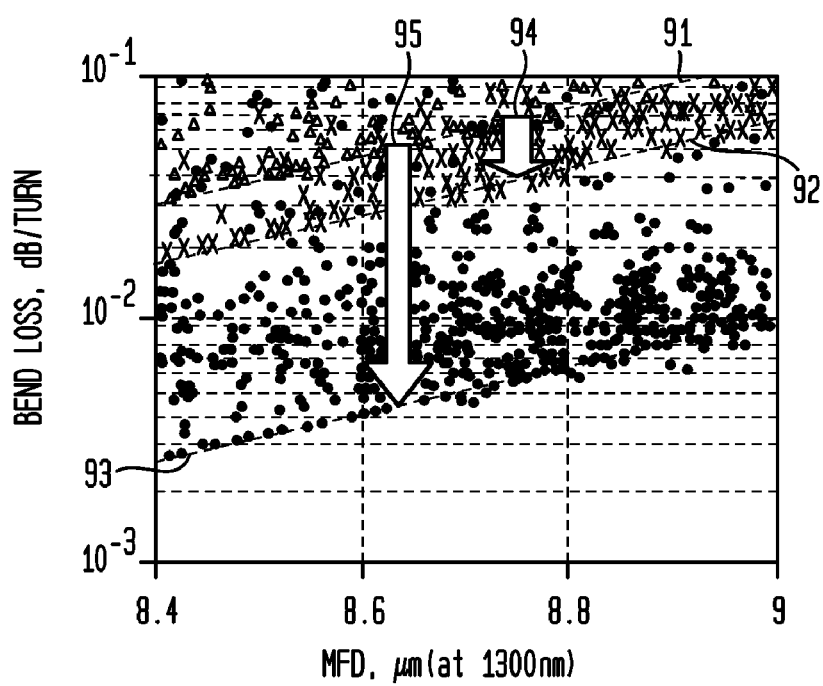
FIG. 9 a graph bend loss vs. MFD at 1300 nm, comparing the numerical performance of two prior art fiber design families with dual trench, ring designs in accordance with one embodiment of our invention.

In order to compare simulated performance of our dual-trench, ring fibers to other design strategies, as shown in FIG. 9, we scanned through many fibers in the design space of conventional depressed inner cladding solid fibers (nearly all of the data points above line 91), solid single-trench fibers without a ring (nearly all of the data points between lines 91 and 92, and a few above line 91), and dual-trench, ring fibers in accordance with one embodiment of our invention (nearly all of the data points between lines 92 and 93, and a few above line 92 and below line 93). All designs that we compared had HOM loss that crossed 20 dB/m (defined as cutoff; FIG. 8, line 83) at the same wavelength (1365 nm), so that the performance of each could be summarized by a single point in a plot of bend loss (at 1550 nm wavelength, assuming 15 mm fiber bend diameter) vs. MFD (at 1300 nm wavelength). Dashed lines 91, 92, 93 delineate the lower bend loss boundary for each of the three fiber types. The vertical arrows 94, 95 highlight the improvement in the bend loss boundaries attained between the depressed inner clad design, on the one hand, and (i) the single-trench, no ring design (arrow 94) and (ii) the dual-trench, ring design of our invention (arrow 95), on the other hand. Details depend on the bend diameter and the HOM loss constraint. In this particular comparison, the data show that our dual-trench, ring design demonstrated a 10 times improvement in bend loss compared to the conventional (depressed inner cladding) low-bend-loss strategy, and a significant improvement over prior single-trench designs without rings. Simulations were done using well-known one-dimensional and two-dimensional finite difference mode solvers.

In summary, the different examples illustrate how the general fiber design strategy of the dual-trench, ring design of our invention can be applied with different prioritization of the conflicting requirements (low bend loss, short cutoff, etc.). Thus, Example III illustrates a design with very good MFD and very good HOM suppression, while achieving bend loss much lower than standard design approaches. The low cutoff measured on 2 m lengths shows that this fiber should be compatible with short-length applications with strict MPI requirements. On the other hand, Example IV has roughly 2-3 times lower bend loss than Example III, with some sacrifice in MFD and 2 m-cutoff. This fiber may be desirable for applications with strict bend requirements, but where MPI in short-length segments is not an important issue. As mentioned above, Example V illustrates the shallow outer trench strategy of FIG. 1C. Simulations indicate that this design should give bend loss ~0.1 dB/turn at 1550 nm, $D_{bend}$=13 mm, MFD ~9.0 µm, and cutoff comparable to Examples III and IV.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, although we described above how various fiber dimensions affect ring-mode confinement losses, and hence reduce the amount of optical energy coupled back from the annular region into the core region, it will be apparent to those skilled in the art that there are other ways to accomplish the same result; e.g., by use of absorption, scattering, fiber bends, mode coupling, or gain. Moreover, these techniques may be used separately or in combination with one another.

In addition, an illustrative, highly generalized application of our access fibers is shown in FIG. 7. Here, an input fiber (e.g., a standard SMF 70) carries an optical signal from a source 72 (e.g., a transmission system) to a facility 74 (e.g., a building housing a business or home). Illustratively, SMF 70 is spliced to an access fiber 76, which carries the signal to a utilization device or apparatus 78 located within or associated with the facility. SMF 70 and access fiber 76 are illustratively spliced to one another at a connection box 77, which is typically located on an interior or exterior wall 74.1 of facility 74. However, the connection box could be located elsewhere within the facility or outside it. In either case, access fiber 76 typically does not have a straight line path to utilization apparatus 78. Rather, it often has to navigate around one or more obstacles 79, which means that it frequently has at least one curved segment or section 76.1. As described previously, such curved sections may have a tight bends in which the fiber bend radius is 4-15 mm, approximately. The mode-matching features of our access fibers permit them to be efficiently spliced to SMF and at the same to be bent around obstacles without experiencing excessive bend loss. Alternatively, SMF 70 may be an output fiber or both an input and an output fiber. Therefore, in general SMF 70 may be referred to as an input/output fiber.

Of course, those skilled in the art will readily recognize that the curved segment or section 76.1 could also be located outside the facility 74.

Finally, although we have emphasized the use of our fibers in access applications, it will also be apparent to those skilled in the art that the reduced bend sensitivity of these fibers renders them attractive for use in, for example, sensors or vehicles (e.g., automobiles, airplanes, trains, boats).

We claim:

1. An optical fiber comprising:
a core region having a longitudinal axis, said core region including an inner core region and an annular outer core region surrounding said inner core region, said inner core region having a radial width in the range of approximately of 8 to 10 µm, the refractive index of said outer core region being less than that of said inner core region and the radial thickness of said outer core region being less than a width of said inner core region and being in the range of approximately 1-5 µm, the difference in refractive index between said inner core region and said outer core region being in the range of approximately 0.003-0.007, and
a cladding region surrounding said core region, said core and cladding regions configured to support and guide the propagation of signal light in a fundamental transverse mode in said core region in the direction of said axis,
said cladding region comprising:
an outer cladding region having a refractive index less than that of said core region, the difference in refractive index between said core region and said outer cladding region being approximately 0.003-0.006, and the refractive indices of said outer cladding region and said outer core region being within approximately 0.002 of one another,
an annular pedestal region having a radial thickness of said pedestal region is approximately 1-4 µm, the refractive indices of said core region and said pedestal region being within approximately 0.003 of one another,
an annular inner trench region disposed between said core region and pedestal region, said inner trench region having a refractive index less than that of said outer cladding region, and
an annular outer trench region disposed between said pedestal region and said outer cladding region, said outer trench region having a refractive index less than that of said outer cladding region, the refractive index difference between said core region and at least one of said trench regions being greater than approximately 0.007, and the interface between said outer cladding region and said outer trench region being located at a radius $r_{out}$ of approximately 17-23 µm,
said pedestal region being configured to resonantly couple at least one transverse mode of said core region, other than said fundamental mode, to at least one transverse mode of said pedestal region.

2. The fiber of claim 1, wherein $0.5 < [(n_{tri} - n_{out})t_{tri}]/[(n_{tro} - n_{out})t_{tro}] < 2.0$, where $n_{out}$ is the outer cladding index, $n_{tri}$ is the inner trench index, $n_{tro}$ is the outer trench index, $t_{tri}$ is the thickness of the inner trench, $t_{tro}$ is the thickness of the outer trench.

3. An access system comprising:
a single mode optical input/output fiber for carrying signal light to/from an accessed facility,
a utilization device associated with said facility,
an access fiber according to claim 1 for coupling said input/output fiber to said utilization device, said access fiber being configured to have a mode field area essentially equal to the mode field area of said input/output fiber.

4. An access system comprising:
a single mode optical input/output fiber for carrying signal light to/from an accessed facility,
a utilization device associated with said facility,
an access fiber according to claim 1 for coupling said input/output fiber to said utilization device, said access fiber being configured to have a mode field area essentially equal to the mode field area of said input/output fiber.

5. The system of claim 4 wherein said access fiber includes at least one curved fiber segment having a bend radius greater than a critical radius given by $cn_{ped}r_{ped}/\Delta n_{mode}$, where c is a constant in the range of approximately 0.8-1.0, $n_{ped}$ is the refractive index of said pedestal region, $r_{ped}$ is the radius of said pedestal region, and $\Delta n_{mode}$ is the effective refractive index difference between the fundamental transverse mode and the first order transverse mode of said core region.

6. The system of claim 5, wherein said bend radius is in the range of approximately 4-15 mm.

* * * * *